(12) United States Patent
Gardner

(10) Patent No.: US 10,061,917 B2
(45) Date of Patent: Aug. 28, 2018

(54) NETWORK OPERATIONS CENTER AND APPLIANCE HOST IN A SINGLE MACHINE

(71) Applicant: Benjamin Robert Gardner, Cortland, IL (US)

(72) Inventor: Benjamin Robert Gardner, Cortland, IL (US)

( * ) Notice: Subject to any disclaimer, the term of this patent is extended or adjusted under 35 U.S.C. 154(b) by 0 days.

(21) Appl. No.: 14/703,215

(22) Filed: May 4, 2015

(65) Prior Publication Data

US 2016/0328556 A1     Nov. 10, 2016

(51) Int. Cl.
*G06F 21/53* (2013.01)
*H04L 29/06* (2006.01)

(52) U.S. Cl.
CPC .............. *G06F 21/53* (2013.01); *H04L 63/02* (2013.01)

(58) Field of Classification Search
CPC ................................ H04L 63/02; G06F 21/53
USPC ............................................................ 726/3
See application file for complete search history.

(56) References Cited

U.S. PATENT DOCUMENTS

| | | | | |
|---|---|---|---|---|
| 8,613,070 B1 * | 12/2013 | Borzycki | ............ | G06F 21/6218 726/8 |
| 2011/0154433 A1 * | 6/2011 | Karabulut | ............. | G06F 21/604 726/1 |
| 2011/0173251 A1 * | 7/2011 | Sandhu | ...................... | G06F 8/61 709/203 |
| 2011/0289507 A1 * | 11/2011 | Khan | ...................... | G06F 8/451 718/104 |
| 2012/0198279 A1 * | 8/2012 | Schroeder | ........... | G06F 11/3672 714/32 |
| 2012/0198440 A1 * | 8/2012 | Shah | .................... | G06F 9/45558 718/1 |
| 2013/0159998 A1 * | 6/2013 | Cawlfield | ........... | G06F 9/45558 718/1 |
| 2014/0007189 A1 * | 1/2014 | Huynh | .................. | G06F 3/0622 726/3 |

(Continued)

OTHER PUBLICATIONS

Jianxin Li et al. "CyberGuarder: A virtualization security assurance architecture for green cloud computing" Published May, 11, 2011 by Elsevier; Future Generation Computer Systems 28 (20120 379-390. Journal homepage: http://www.elsevier.com/locate/fgcs.*

(Continued)

*Primary Examiner* — Hadi S Armouche
*Assistant Examiner* — Khalil Naghdali

(57) ABSTRACT

System and method of a single machine or cluster of machines acting as a single machine that simplifies and consolidates the hosting of appliances using virtualization, containers, and or any type of sandboxing to host virtual appliances, however, interconnecting these appliance nodes in a manner of having one centralized node acting as the security center, firewall appliance, and information distributer for not only the local virtual network(s), machines, appliances, but physical and foreign virtual networks which includes but is not limited to wireless connectivity and or whatever the current ubiquitous connectivity, as well as multiple sub-networks via single or multiple networking adapters; using these methods allows for a completely secure customized network environment with all the needed appliances for the intended use case.

1 Claim, 1 Drawing Sheet

(56) References Cited

U.S. PATENT DOCUMENTS

2014/0230076 A1* 8/2014 Micucci ............ G06F 17/30861
  726/28
2016/0241702 A1* 8/2016 Gorajala Chandra ......................
  H04M 1/72533

OTHER PUBLICATIONS

Loganayagi.B et al. "Enhanced Cloud Security by Combining Virtualization and Policy Monitoring Techniques" Published in 2011; Procedia Engineering 30 (2012) 654-661 Homepage: http://www.elsevier.com/locate/procedia.*

* cited by examiner

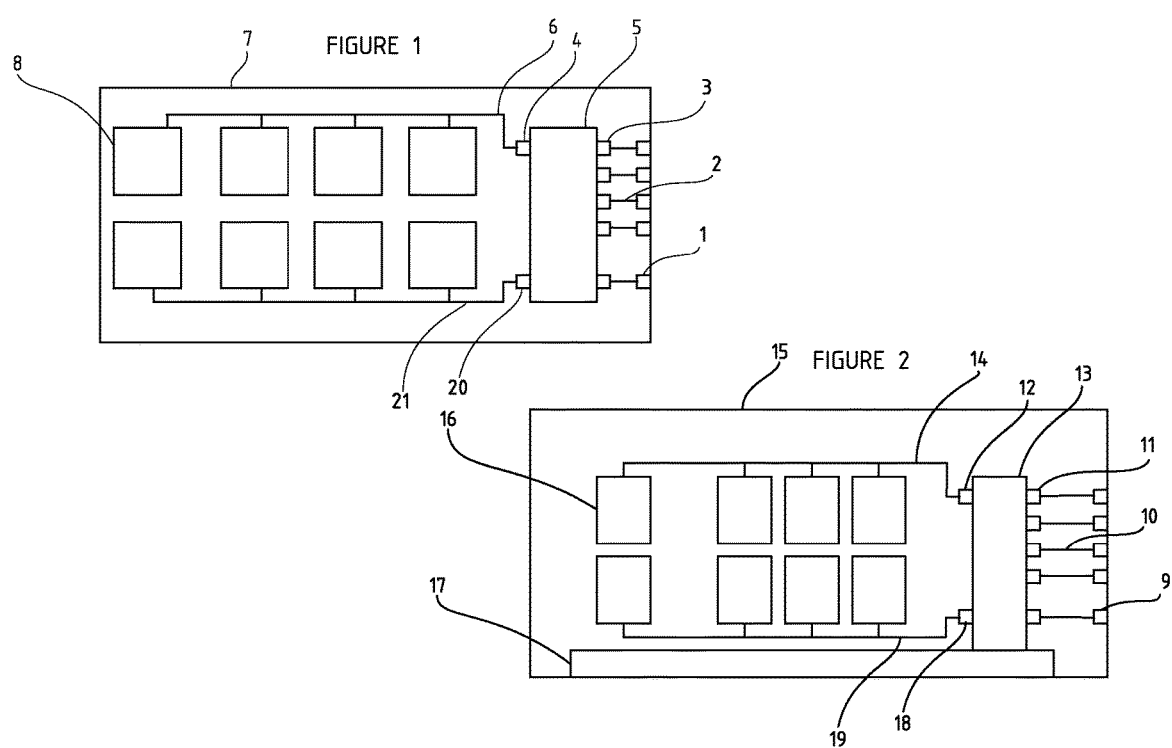

NETWORK OPERATIONS CENTER AND APPLIANCE HOST IN A SINGLE MACHINE

CROSSREFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

This invention relates to information technology, information security, electronics device management, home automation, and cloud computing.

Historically information technology, information security, cloud computing, electronics devices, computer networking, computational computing, and home automation are all separate entities with separate managing and security processes as well as being housed in separate devices and or machines. It is desired to consolidate and house all of said functions in a single machine eliminating power consumption and communication redundancies while significantly improving security and management and allowing for retrofitting.

Said machine would provide information security, virtualized, container, and or sandboxed environments, and networking comprised and hosted in a single machine, in particular said design of said machine provides ability to house an entire network operations center, isolated private network, virtual appliance hosting, container appliance hosting, centralized controller processing, and information security and threat management with scalability. A key advantage is to deploy said machine in any physical or virtual computing environment and have a complete computing network with any desired configuration. Said machine allows having many combinations of appliance services including but not limited to Enterprise Resource Planning, file server, web server, gaming server, gaming console, media server, computational processing, home and or building automation, and or cloud computing. Thus encompassing an entire computing network in said machine with the option of providing said resources to external and internal physical networks in a secure manner.

BRIEF SUMMARY OF THE INVENTION

This invention provides a mechanism for a private, isolated and secure computing environment from the method of how said invention's virtual machine appliances, containers, and or any type of sandboxing mechanism are constructed together and integrated with said machine's hardware allowing physical and virtual machines whether wireless or wired to join said machine's network and have access to all of locally hosted appliances while being firewalled, filtered, isolated, and secured by said virtual security appliance that is part of said invention's centralized routing and universal threat methods. In particular, said machine is suitable for retrofit into existing networks as well as providing a whole computing network.

BRIEF DESCRIPTION OF THE SEVERAL VIEWS OF THE DRAWINGS

FIG. 1 is a view in elevation of a diagram consisting of a box that represents a machine that is host to multiple virtual appliance nodes and connectivity to said machine's hardware.

FIG. 2 is a side view of a diagram consisting of a box that represents a machine that is host to multiple virtual appliance nodes and connectivity to said machine's hardware.

DESCRIPTION OF PREFERRED EMBODIMENT

FIG. 1 shows an elevated view of a box 7 that represents a machine or a cluster equivalent that houses a hypervisor host and components including said external network, communication, and or modem interface 1 that provides said virtual security appliance 5 external network access via a device pass through mechanism, virtual bridge, virtual network, or equivalent 2, said virtual security appliance 5 using said virtual network interfaces 4 and or 20 and or bridges, virtual networks, or equivalent 6 and or 21 interchangeably; provides routing, universal threat management, virtual private networking, encryption, as well as firewall capabilities and private internal network access, to said network of multiple virtual appliance nodes 8 that are connected via bridges, virtual networks, or equivalent 6 and or 21 interchangeably, as well as external nodes that are connected to any of the machine's external interfaces 3 via pass through, bridges, virtual networks or equivalent, creating a dynamic, independent, private and protected network of internal and external computing nodes.

FIG. 2 shows an elevated view of a box 15 that represents a machine or a cluster equivalent that houses a hypervisor host and host layer 17 including the external network, communication, and or modem interface 9 that provides said virtual security appliance 13 external network access via a device pass through mechanism, virtual bridge, virtual network, or equivalent 10, said virtual security appliance 13 using said virtual network interface 12 and or 18 and or bridges, virtual networks, or equivalent 14 and or 19 interchangeably; provides routing, universal threat management, virtual private networking, encryption, as well as firewall capabilities and private internal network access, to said network of multiple virtual appliance nodes 16 that are connected via bridges, virtual networks, or equivalent 14 and or 19 interchangeably, as well as external nodes that are connected to any of the machine's external interfaces 11 via device pass through, bridges, virtual networks or equivalent 10, creating a dynamic, independent, private and protected network of internal and external computing nodes.

DETAILED DESCRIPTION OF THE INVENTION

This invention and its detailed mechanisms and methods is intended for a single machine, or cluster of machines acting as a single machine, based upon computing hardware and software, the ability to host multiple appliances using virtual machines, containers, or any type of sandboxing mechanism, and have said virtual appliance nodes connected and configured in a manner that centralizes one virtual appliance node that acts as a router and or firewall and or informational security portal to not only to said local virtual appliance's that are being hosted on said machine but as well as physical networks that are connected via said machine's communication interfaces, wireless networks or equivalent ubiquitous networks, external virtual machines and virtual networks, container, or sandboxed mechanisms. Allowing one machine to provide all routing, services, device access, security, threat management, and software that are needed for networks as well as allowing the possibility for creating an isolated/private network embedded in an existing network.

With flexibility and security in mind said machine is designed to be able to be customized for each individual use case however still using said core methodology of constructed virtual appliance nodes and said machines hardware.

Said invention can incorporate a variety of hosts and or appliances including but not limited to an Information Technology toolbox appliance, security appliance, enterprise resource planning system, a ticketing system appliance, web server, client management appliance, automated backup appliance, LDAP and or Kerberos server appliance, file server appliance, computational computing appliance, gaming console appliance, gaming server appliance, centralized controller processing appliance, and virtual portal appliance.

Other objects and advantages besides those discussed above will be apparent to those skilled in the art from the description of the preferred embodiment of the invention which follows. Thus, in the description, reference is made to the accompanying drawings, which form a part hereof, and which illustrate one example of the invention. Such example, however, is not exhaustive of the various alternative forms of the invention. Therefor, reference should be made to the claims, which follow the description for determining the full scope of the invention.

FIG. 1

1. Physical External network, communication, and or modem interface.
2. Bridge, Virtual Network, or Pass through connection.
3. Virtual Appliance and or Container Network interface.
4. Physical internal network, communication, or modem interface.
5. Virtual Routing, Universal Threat Management, and Security appliance.
6. Bridge, Virtual Network, or Pass through connection.
7. Physical Machine Container.
8. Virtual Appliance Nodes.
20. Internal Virtual Network Adapter.
21. Bridge or Virtual Network.

FIG. 2

9. Physical External network, communication, and or modem interface.
10. Bridge, Virtual Network, or Pass through connection.
11. Virtual Appliance and or Container Network interface.
12. Physical internal network, communication, or modem interface.
13. Virtual Routing, Universal Threat Management, and Security appliance.
14. Bridge, Virtual Network, or Pass through connection.
15. Physical Machine Container.
16. Virtual Appliance Nodes.
17. Hypervisor Host layer.
18. Internal Virtual Network Adapter.
19. Bridge or Virtual Network.

I claim:

1. A network operations center and appliance host in a single machine comprising:

a hypervisor host with networking capabilities consisting of a single external physical networking interface, virtual interfaces, virtual networks, virtual bridges: one or more client hypervisor instances with virtual networking capabilities each containing an operating system and applications:

a central hypervisor instance containing an operating system and applications, consisting of internal virtual interfaces and external interfaces using device pass through mechanisms to said hypervisor host via external physical networking interface:

a security appliance operating within said central hypervisor instance;

wherein said hypervisor host using sandboxing mechanisms, positions said client hypervisor instances in a centralized manner using said virtual bridges and or said virtual networks interchangeably to said internal interfaces of said central hypervisor instance, conversely, said central hypervisor instance through external interface device using pass through mechanisms to said hypervisor host via external physical networking interface allows for forming network connections with adjoining external networks, whereby all external network communication flows through said security appliance and said hypervisor host via external physical network interface, and only through said security appliance and said hypervisor host via external physical network interface, on its way into or out of said hypervisor host, whereby said central hypervisor instance dedicated as sole communication gateway and filter, provides network address translation, routing, bridging, DHCP, DNS, firewalling, and universal threat management, to and or from said client hypervisor instances, wherein said central hypervisor instance provides network address translation, routing, bridging, DHCP, DNS, firewalling, and universal threat management services to said adjoining networks.

* * * * *